Jan. 5, 1926.
W. F. DOWNS
1,568,813
PROCESS FOR PURIFYING HYDROCARBON LIQUIDS
Filed May 6, 1922
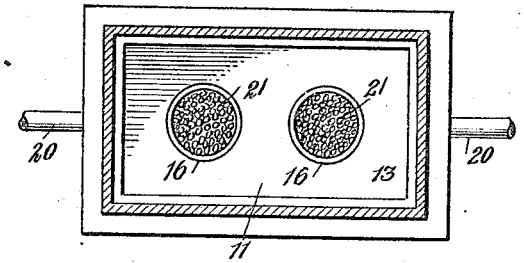
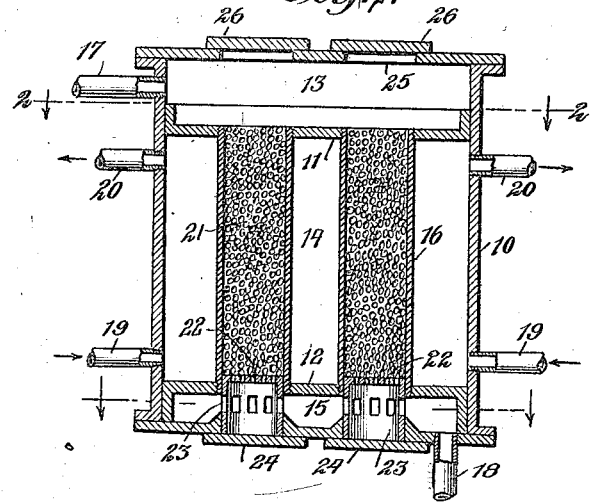
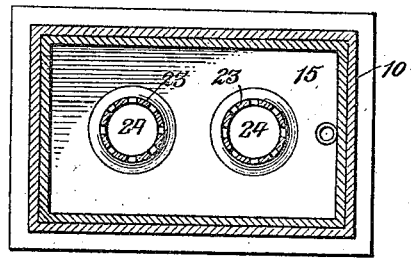
INVENTOR
William F. Downs
BY
Dean, Fairbank, Obright & Hirsch
ATTORNEYS Patented Jan. 5, 1926.

1,568,813

UNITED STATES PATENT OFFICE.

WILLIAM F. DOWNS, OF CHATHAM, NEW JERSEY; MARY GARDNER DOWNS ADMINISTRATRIX OF SAID WILLIAM F. DOWNS, DECEASED.

PROCESS FOR PURIFYING HYDROCARBON LIQUIDS.

Application filed May 6, 1922. Serial No. 558,851.

*To all whom it may concern:*

Be it known that I, WILLIAM F. DOWNS, a citizen of the United States, and resident of Chatham, in the county of Morris and State of New Jersey, have invented certain new and useful Improvements in Processes for Purifying Hydrocarbon Liquids, of which the following is a specification.

The main object of my invention is to purify or improve the quality of liquid hydrocarbons so as to render them better adapted to the commercial purpose for which they are to be used. The improvement sought may be designated as rendering them clean and sweet, and involves a reduction in the amount or quality of unsaturated compounds present, lightening the color and removing the odor or rendering it less objectionable. I secure the desired object by means of my improved method for treating the liquids with anhydrous aluminum chloride or other metallic chlorides.

The fact that certain compounds, including anhydrous aluminum chloride, are useful for this purpose has been known at least since the issuance of the British patent to Abel, 4769 of 1877, but so far as I know, the various proposed methods or treatment have always involved the intermixing of the aluminum chloride or other compound and the hydrocarbon, and a heating of the mixture in a still or other chamber. After such mixing and heating it has been necesary to separate the purified or improved liquid from the aluminum chloride and residue by filtration or other separate and subsequent operation. The percentage of aluminum chloride, and the temperature and time of treatment have been varied and the treatment applied to hydrocarbons in different boiling point ranges.

In my improved process the aluminum chloride is employed in the form of a porous filter bed which may be maintained at any temperature desired, below its volatilization temperature. The hydrocarbon to be treated is caused to flow through the filter bed by pressure, suction or gravity, and at any desired rate. By varying the rate of flow, or by varying the thickness of the filter bed, or by employing a series of successive filter beds, or by a combination of these ways, the hydrocarbon may be maintained in intimate contact with the aluminum chloride for any desired time interval, depending upon the hydrocarbon being treated, the temperature employed, and the results which it is desired to obtain. Furthermore, the rate of flow may be decreased so as to maintain a longer period of contact as the efficiency of the aluminum chloride decreases, so that the obtaining of a uniform product is possible as long as the aluminum chloride remains active. As the hydrocarbon is caused to flow through the bed, all parts of it come into very intimate contact with the aluminum chloride, and therefore the time of treatment for any particular portion of the liquid may be comparatively short, and very much shorter than is required where a small quantity of the aluminum chloride is mixed in a large volume of liquid, as has heretofore been done.

With other processes heretofore employed the boiling of the hydrocarbon in the presence of the aluminum chloride results in the formation of a tarry or coke-like residue in the still which becomes entangled or intermixed with the aluminum chloride, or coated over the particles of the latter so as to very soon render the aluminum chloride inactive or very inefficient in its action. The regeneration or purification of aluminum chloride intermixed with residue of this character involves considerable expense and trouble. Also, the lower boiling constituents boil off before the higher boiling ones, so that the character of the product may vary as the distilling action proceeds. With my process the hydrocarbon is kept below its boiling point, and is continuously delivered and withdrawn, and only a comparatively small quantity of the hydrocarbon is undergoing treatment at one time. The product will remain uniform as long as the medium remains active, and when it ceases to be active it may be very easily and quickly removed and replaced by fresh charge. The medium remains active for a longer period as the tarry residues of a distilling operation do not come in contact with the filter bed. The hydrocarbon does not need to be filtered after being treated as is the case where the hydrocarbon and aluminum chloride are mixed and heated together. The aluminum chloride filter bed acts as a mechanical filter to remove solid impurities and may, if desired, be combined with or superposed on a filter of other character or material. The aluminum chloride filter bed itself preferably includes an inert substance such as silica or graphite, or a mixture of the two which will tend to keep the filter bed porous for a longer period and facilitate the free flow of the hydrocarbon therethrough. The filter bed is preferably kept heated to a temperature below the volatilizing point of the aluminum chloride, and below the boiling point of the hydrocarbon being treated. This heating or warming action tends to facilitate the purifying action, but it may be employed solely to reduce the viscosity of the hydrocarbon if the latter have high viscosity, such for instance as a lubricating oil.

My invention also includes a novel apparatus in which my improved process may be carried out. In the accompanying drawings:

Fig. 1 is a vertical section through an apparatus embodying my invention, and constructed to carry out my improved process, and Figs. 2 and 3 are transverse sections on the lines 2—2 and 3—3 respectively of Fig. 1.

In the apparatus shown in the drawing, there is provided a casing 10 having transverse partitions 11 and 12 dividing the interior of the casing into upper, intermediate and lower compartments or chambers 13, 14 and 15. The two partitions are connected by tubular members 16 which serve to carry the filter beds and form passages between the upper chamber 13 and the lower chamber 15. The liquid to be treated is admitted to the upper chamber 13 through a suitable inlet 17, and the purified liquid is drawn off through the outlet 18 from the lower compartment 15.

The intermediate compartment 14, which surrounds the tubes 16 and which is out of direct communication with the path for the hydrocarbon liquid, serves to receive or contain a temperature-controlling liquid or gas. This chamber may have one or more inlets 19 at the lower part thereof, and one or more outlets 20 at the upper part, so that the general direction of flow of the temperature controlling medium is in the reverse direction to that of the flow of the liquid to be treated.

The anhydrous aluminum chloride or other metallic chloride or mixtures of the same, and preferably with an inert substance such as graphite, silica or a mixture of the two, forms the filter beds 21 which are within the tubes 16. Each porous mass or filter bed is supported on a screen or perforated partition 22, which latter may be carried by or supported on sleeves or tubes 23 extending through the lower compartment 15, and supported on removable cover plates 24. These tubes may have perforations within the compartment 15 for the escape of liquid to the latter. The top wall of the casing may have openings 25 opposite to the ends of the several filter beds which may be closed by covers 26. When it is desired to remove the filter bed and substitute fresh material the lower cover plates 24 and the tubes 23 may be removed, and the filter bed material will be free to drop out. If it has become caked it may be forced out from above by removing the cover plates 26. Fresh material may be inserted from the top upon the replacing of the tubes 23 and cover plates 24. All of the joints should be tight enough to exclude air from the apparatus, and to prevent leakage from the chamber 14 and the chambers or passages for the hydrocarbon liquid. The tubes 16 are shown as being filled to the top with the material, but it will be evident that they may be filled to any desired level, depending upon the purity or activity of the ingredients or the character of the liquid acted upon, and also the temperature maintained. The temperature of the medium in the chamber 14 should be below the vaporizing point of aluminum chloride or compounds of the aluminum chloride and hydrocarbon, if any such be formed, and this temperature should also be below the boiling point of the liquid to be treated. It is preferable to maintain this temperature comparatively high within the limits above specified, in order that the viscosity of the oil may be reduced as far as possible, and to secure the increased activity of the aluminum chloride due to the application of heat thereto. The desired temperature may be obtained by varying the rapidity of circulation of the controlling medium, as well as by varying the temperature of the medium itself.

With my improved apparatus the hydrocarbon liquid to be treated enters the passage 17 and is withdrawn from the passage 18. The upper and lower compartments as well as the filter bed, may be kept filled with the liquid at all times, and the rate of flow varied to secure the desired result. The liquid may be delivered under pressure, or withdrawn by suction, or the liquid may flow through the filter bed merely by the action of gravity, the liquid being supplied through the pipe 17 at such rate as to keep the upper surface at the filter bed flooded.

Having thus described my invention, what I claim as new and desire to secure by Letters Patent is:—

1. The process of purifying hydrocarbons, consisting in passing them in liquid form through a filter bed containing metallic chloride maintained in a heated condition, but below the boiling point of the hydrocarbon and below the vaporizing point of the chloride.

2. The process of purifying hydrocarbons, consisting in passing them in liquid form through a filter bed containing anhydrous aluminum chloride maintained in a heated condition, but below the boiling point of the hydrocarbon and below the vaporizing point of the chloride.

3. The process of purifying hydrocarbons, consisting in passing them in liquid form through a filter bed containing anhydrous aluminum chloride and an inert substance maintained in a heated condition, but below the boiling point of the hydrocarbon and below the varporizing point of the chloride.

4. The process of purifying hydrocarbons consisting in passing them in liquid form through a filter bed containing anhydrous aluminum chloride and maintaining the temperature of the filter bed below the volatilizing temperature of the aluminum chloride, and below the boiling point of the hydrocarbon liquid being treated.

5. The process of purifying a hydrocarbon liquid, consisting in passing the same through a filter bed containing anhydrous aluminum chloride, and varying the rate of flow of the liquid in accordance with the activity of the aluminum chloride.

6. The process of purifying a hydrocarbon liquid, consisting in passing the same through a filter bed containing anhydrous aluminum chloride, and reducing the rate of flow of the liquid as the filter bed decreases in activity.

7. The process of purifying hydrocarbons, consisting in passing the same in liquid form through a filter bed containing anhydrous aluminum chloride and heating the filter bed to reduce the viscosity of the liquid being treated but not to vaporize it.

Signed at New York in the county of New York and State of New York this 3rd day of May A. D. 1922.

WILLIAM F. DOWNS.